US012270733B2

(12) United States Patent
Hayzen et al.

(10) Patent No.: US 12,270,733 B2
(45) Date of Patent: *Apr. 8, 2025

(54) GRAPHICAL DISPLAY OF DISCONTINUOUS WAVEFORM DATA

(71) Applicant: Computational Systems, Inc., Knoxville, TN (US)

(72) Inventors: Anthony J. Hayzen, Knoxville, TN (US); Christopher G. Hilemon, Knoxville, TN (US); John W. Willis, Oak Ridge, TN (US)

(73) Assignee: Computational Systems, Inc., Knoxville, TN (US)

( * ) Notice: Subject to any disclaimer, the term of this patent is extended or adjusted under 35 U.S.C. 154(b) by 374 days.

This patent is subject to a terminal disclaimer.

(21) Appl. No.: 17/862,434

(22) Filed: Jul. 12, 2022

(65) Prior Publication Data
US 2022/0412837 A1 Dec. 29, 2022

Related U.S. Application Data

(63) Continuation of application No. 16/161,758, filed on Oct. 16, 2018, now Pat. No. 11,435,260.

(51) Int. Cl.
*G01M 7/02* (2006.01)
*G01H 1/00* (2006.01)

(52) U.S. Cl.
CPC .......... *G01M 7/025* (2013.01); *G01H 1/003* (2013.01)

(58) Field of Classification Search
CPC .............. G01M 7/025; G01M 13/028; G01H 1/003; G01H 1/04; G01H 1/12; G06F 3/14

See application file for complete search history.

(56) References Cited

U.S. PATENT DOCUMENTS 5,974,361 A * 10/1999 Vu ..................... G01R 19/2509
361/87
2012/0117130 A1* 5/2012 Gearhart ................. G06F 21/10
707/E17.143

(Continued)

FOREIGN PATENT DOCUMENTS

| EP | 2912416 B1 | 5/2018 |
| EP | 3348925 A1 | 7/2018 |
| JP | H10247361 A * | 9/1998 |

*Primary Examiner* — Catherine T. Rastovski
*Assistant Examiner* — Lal C Mang
(74) *Attorney, Agent, or Firm* — Luedeka Neely, P.C.

(57) ABSTRACT

A vibration data collection device monitors vibration of a machine, generates original machine vibration waveform data based on the monitored vibration, and removes portions of the original machine vibration waveform data that do not indicate an occurrence of a vibration event related to a potential fault in the machine. The vibration data collection device then stores thinned waveform data that includes blocks of the original machine vibration waveform data and excludes the portions that have been removed. A data analysis computer generates a thinned waveform plot based on the thinned waveform data. In some embodiments, the thinned waveform plot includes the blocks of original machine vibration waveform data separated in time by gaps representing the portions that have been removed. In some embodiments, the thinned waveform plot that includes the blocks of the original machine vibration waveform data and representative blocks of data that each represent the portions of the original machine vibration waveform data that have been removed. A display device displays the thinned waveform plot for viewing by an analyst.

10 Claims, 4 Drawing Sheets

(56) References Cited

U.S. PATENT DOCUMENTS

| | | | |
|---|---|---|---|
| 2014/0121999 A1* | 5/2014 | Bracken | G01M 3/243 |
| | | | 702/51 |
| 2014/0195197 A1* | 7/2014 | Boerhout | H04W 52/0261 |
| | | | 702/182 |
| 2016/0047716 A1* | 2/2016 | Thomson | G01M 13/045 |
| 2018/0202681 A1* | 7/2018 | Kim | F24F 11/38 |
| 2019/0101103 A1* | 4/2019 | Haseba | F03D 17/00 |

* cited by examiner

GRAPHICAL DISPLAY OF DISCONTINUOUS WAVEFORM DATA

RELATED APPLICATIONS

This application claims priority to co-pending U.S. patent application Ser. No. 16/161,758, filed Oct. 16, 2018, as a continuation thereof, the entirety of which is incorporated herein by reference.

FIELD

This invention relates to the field of storage and display of transient waveform data. More particularly, this invention relates to a system for graphical display of discontinuous waveform data.

BACKGROUND

Vibration monitoring systems are used to monitor the vibration of machines to detect faults in machine components, and to detect degradation in performance before faults occur. Some systems monitor vibration continuously, rather than intermittently, and store the continuous vibration information as waveform data. Continuous vibration waveform data storage requires large amounts of storage capacity. For continuous real-time storage of most vibration waveform data, this typically requires a local storage device having a capacity of at least 100 Gb. Even with this amount of available space, a continuous online vibration monitoring device can typically store only a few days of waveform data. Once the storage is fully used, the system over-writes the old waveform data using a first-in first-out buffering process.

When an abnormal vibration event occurs, it is generally desirable to preserve an archival copy of at least a portion of the waveform data for long term data analysis. These archived portions of waveform data are typically 10-100 Mb each. Over time, these archived portions occupy a considerable amount of storage space, such as many hundreds of gigabytes.

Known spectral correlation waveform thinning methods have been used to thin these large waveform data portions down to considerably smaller sizes by creating blocks of waveform data that represent the bulk of the waveform. When graphically displaying these blocks of waveform data, information must be provided to the vibration analyst to indicate which of the graphically displayed time waveform blocks are from the original waveform and which blocks are merely representative of the original waveform. Also, it is desirable to provide a smooth transition between the original data and the representative data at the points at which the data blocks intersect.

What is needed, therefore, is a system for plotting thinned waveform data that clearly indicates to the data analyst which data is original and which is representative of the original waveform, and that smooths the transitions between the original data and the representative data in the data plots. Such a system would provide a solution to a significant technological problem as described above that currently exists in known methods for displaying thinned vibration waveform data on display devices.

SUMMARY

According to preferred embodiments described herein, there are two basic approaches to graphically displaying thinned time waveforms. As depicted in FIG. 1, a first approach is to leave blank gaps in the time waveform plot in regions where the waveform has been thinned, and show only the original waveform blocks at their proper locations on the time axis. As depicted in FIG. 2, a second approach is to plot the original waveform data blocks at their proper locations on the time axis, and fill in the thinned portions on the time axis between the original waveform blocks with reference blocks of data. To distinguish the filled in thinned portions from the original portions, the thinned portions may be plotted in a different color and/or different line type. In this way, it is clearly visible to the user which portions of the time waveform are original and which portions are representative of the original.

Intersections between an original waveform portion and adjacent thinned portions may not match up very well. Preferred embodiments address this issue in various ways. One approach is to leave the intersection as-is, even if it is discontinuous. This is usually necessary when the beginning and ending of intersecting waveform blocks do not align with a tachometer pulse, such as when there was no corresponding tachometer signal or it was not used. When the intersecting waveform blocks begin and end on a tachometer pulse, their intersections are generally very close and little may need to be done to connect them. However, as shown in FIG. 3, the intersections of the waveform blocks can be smoothed using various smoothing algorithms, such as a polynomial fit to several waveform data points on either side of the intersecting waveforms.

It will be appreciated that the graphical display methods described herein are not limited to thinned time waveforms, but also apply to any waveform that has gaps between waveform sections, such as "snapshot" transient waveforms, in which the gaps are filled with blocks of representative waveform data.

As described hereinafter, some preferred embodiments are directed to a vibration data collection and display system that includes a vibration data collection device, a data analysis computer, and a display device. The vibration data collection device monitors vibration of a machine, generates original machine vibration waveform data based on the monitored vibration, and removes one or more portions of the original machine vibration waveform data that do not indicate an occurrence of a vibration event related to a potential fault or performance problem in the machine. The vibration data collection device then stores thinned waveform data that includes one or more blocks of the original machine vibration waveform data and excludes the one or more portions that have been removed. The data analysis computer receives the thinned waveform data and executes instructions to generate a thinned waveform plot based on the thinned waveform data. The thinned waveform plot includes the blocks of original machine vibration waveform data, which are separated in time by gaps representing the one or more portions that have been removed. The display device displays the thinned waveform plot for viewing by an analyst.

In some embodiments, one or more of the blocks of the original machine vibration waveform data in the thinned waveform data indicate an occurrence of a vibration event related to a potential fault or performance problem in the machine.

In some embodiments, the vibration data collection device comprises a handheld measurement device having a vibration sensor that is momentarily attached to the machine while the original machine vibration waveform data is generated.

In some embodiments, the vibration data collection device comprises a networked measurement device that is semi-permanently installed on the machine for continuously generating the original machine vibration waveform data, and that communicates the thinned waveform data to the data analysis computer via a communication network.

In some embodiments, the data analysis computer generates the thinned waveform plot to include one or more blocks of the original machine vibration waveform data and one or more representative blocks of data. Each of the representative blocks represent a corresponding portion of the original machine vibration waveform data that has been removed.

In some embodiments, the data analysis computer executes instructions to implement a curve-fitting process in the thinned waveform plot at each intersection between a block of the original machine vibration waveform data and an adjacent representative block of data. This process smooths the transitions from blocks of the original machine vibration waveform data to adjacent representative blocks of data in the thinned waveform plot. In some embodiments, the curve-fitting process is a polynomial curve-fitting process.

In some embodiments, the intersections between blocks of the original machine vibration waveform data and adjacent representative blocks of data temporally coincide with pulses generated by a tachometer that indicate the rotational speed of the machine.

In some embodiments, the thinned waveform plot is generated such that the one or more blocks of the original machine vibration waveform data are depicted in a first color or first line style, and the one or more representative blocks of data are depicted in a second color or second line style that is different from the first color or first line style.

In some embodiments, the one or more representative blocks of data comprise one or more blocks of the original machine vibration waveform data.

In another aspect, some preferred embodiments are directed to method for collection and display of vibration data. The method includes:
(a) monitoring vibration of a machine and generating original machine vibration waveform data based on the vibration monitored;
(b) removing one or more portions of the original machine vibration waveform data that do not indicate an occurrence of a vibration event related to a potential fault or performance problem in the machine;
(c) storing thinned waveform data comprising one or more blocks of the original machine vibration waveform data and excluding the one or more portions that have been removed;
(d) generating a thinned waveform plot based on the thinned waveform data, wherein the thinned waveform plot comprises the one or more blocks of the original machine vibration waveform data that are separated in time by gaps representing the one or more portions that have been removed;
(e) and displaying the thinned waveform plot for viewing by an analyst.

In some embodiments, step (d) comprises generating a thinned waveform plot that includes the one or more blocks of the original machine vibration waveform data and one or more representative blocks of data that each represent the one or more portions of the original machine vibration waveform data that have been removed.

In some embodiments, the method includes implementing a curve-fitting process in the thinned waveform plot at each intersection between a block of the original machine vibration waveform data and an adjacent representative block of data. This process smooths the transitions from blocks of the original machine vibration waveform data to adjacent representative blocks of data in the thinned waveform plot. In some embodiments, the curve-fitting process comprises a polynomial curve-fitting process.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

Figure 4:
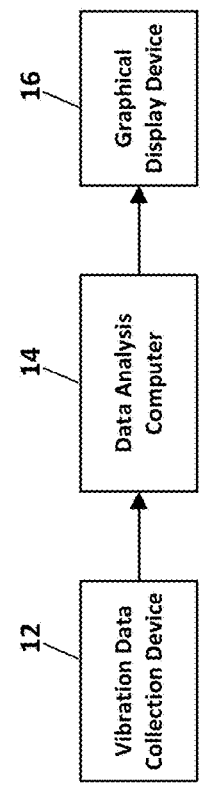
FIG. 4 depicts a vibration data collection and display system according to an embodiment of the disclosure.

As shown in FIG. 4, an exemplary embodiment of a vibration data collection and display system includes a vibration data collection device 12, a data analysis computer 14, and a graphical display device 16. The vibration data collection device 12 may be a handheld measurement device, such as the AMS 2140 Machinery Health Analyzer™ by Emerson Process Management™, or a networked measurement device that is semi-permanently installed on a machine, such as the AMS 9420 Wireless Vibration Transmitter™, also by Emerson Process Management™. In either case, the vibration data collection device 12 includes a sensor, such as an accelerometer, for sensing machine vibration and generating a vibration signal. The vibration data collection device 12 also includes signal conditioning circuitry, analog-to-digital conversion circuitry, and data storage circuitry for conditioning the vibration signal and at least temporarily storing vibration waveform data before the data is transferred to the data analysis computer 14. The data analysis computer 14 includes digital processing hardware and software for processing the vibration waveform data as described in more detail hereinafter. The graphical display device 16 displays the processed waveform data for viewing by a data analyst.

In some embodiments, the vibration data collection device 12, the data analysis computer 14, and the graphical display device 16 are components of one device, such as a handheld measurement device. In other embodiments, the vibration data collection device 12, the data analysis computer 14, and the graphical display device 16 are separate devices that communicate via a wired or wireless communication network.

Figure 5:
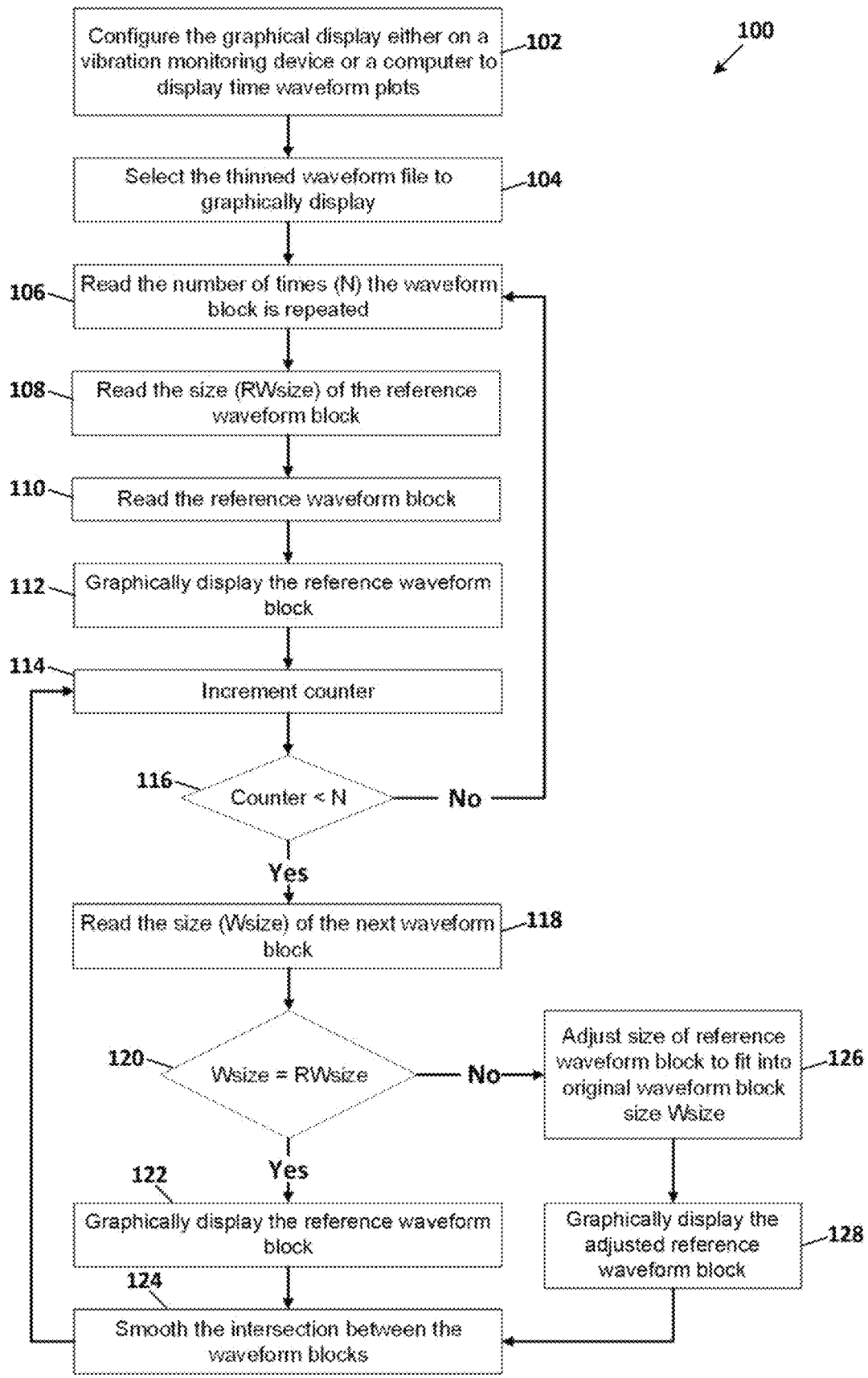
FIG. 5 depicts a process for reading thinned waveform data and displaying a thinned waveform on a display device according to an embodiment of the disclosure.

FIG. 5 depicts a preferred embodiment of a process that is preferably implemented in software executed by the data analysis computer 14. The process generally involves reading a data structure that contains a thinned waveform, and displaying the thinned waveform on the display device 16. In reading the data structure, the process determines the number of waveform blocks (N) from the original waveform that are to the replaced with a reference waveform block in the thinned portions of the waveform data, and determines the size of each waveform block that is being replaced. The process then successively repeats the reference waveform block the specified number of times (N). If the original waveform block size does not exactly match the reference waveform block size, then the displayed reference block is either extended or reduced in size to match the original block size. This is necessary for synchronization with the timing of the tachometer pulses. The intersections between adjacent waveform blocks are then smoothed using a smoothing algorithm.

Figure 1:
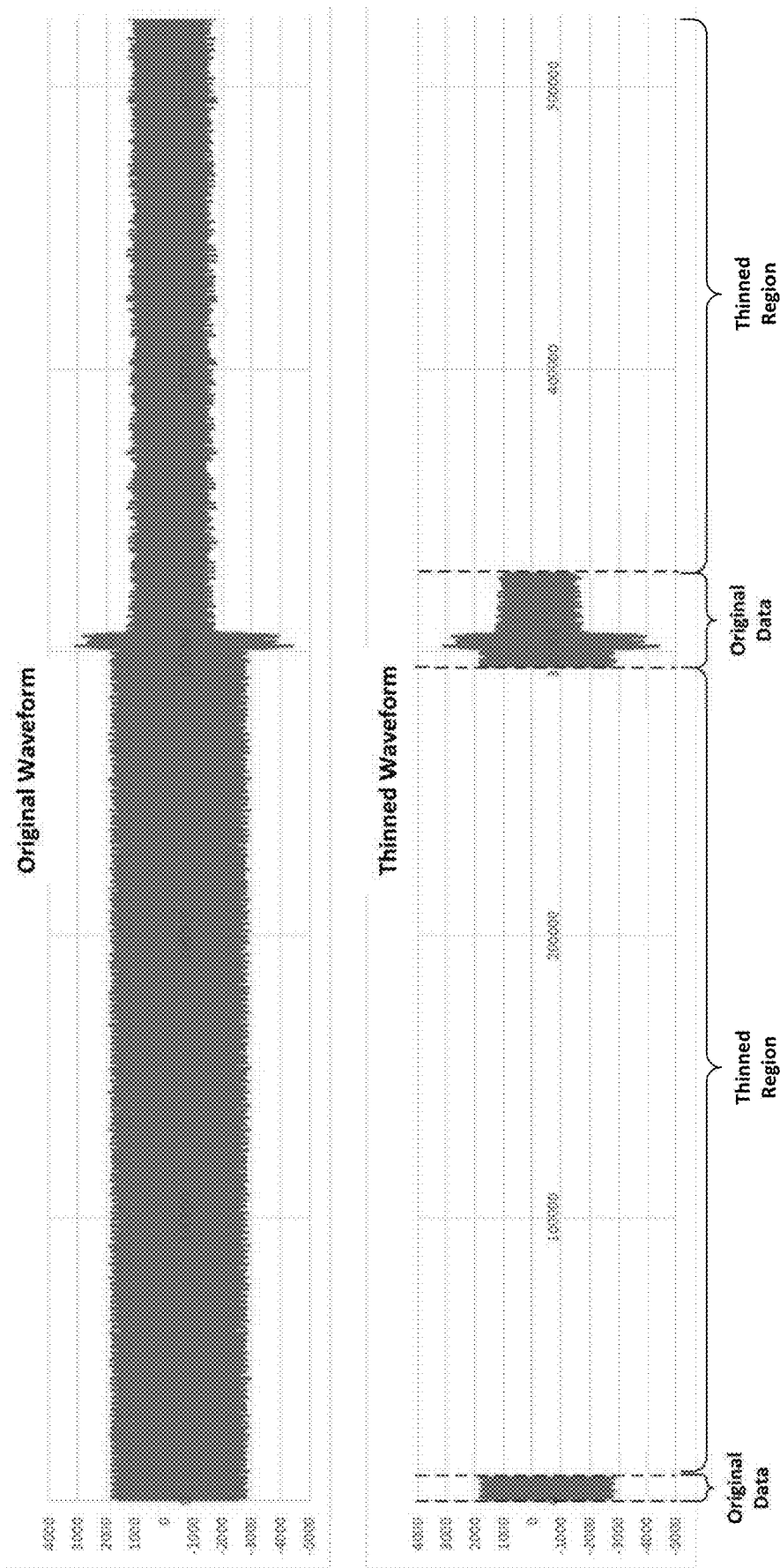
FIG. 1 depicts an original waveform plot and a thinned waveform plot according to an embodiment of the disclosure.
Figure 2:
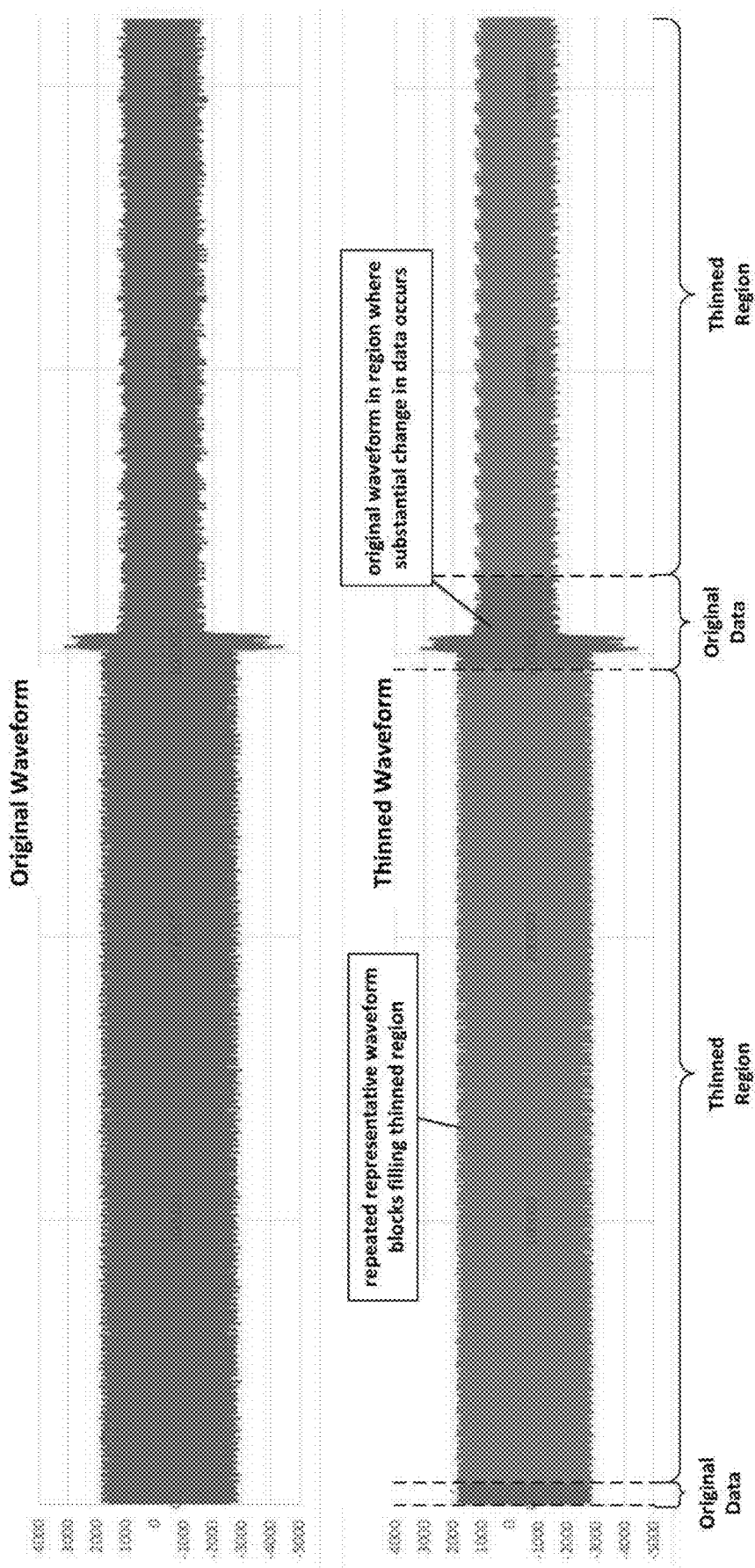
FIG. 2 depicts an original waveform plot and a thinned waveform plot according to an alternative embodiment of the disclosure.
Figure 3:
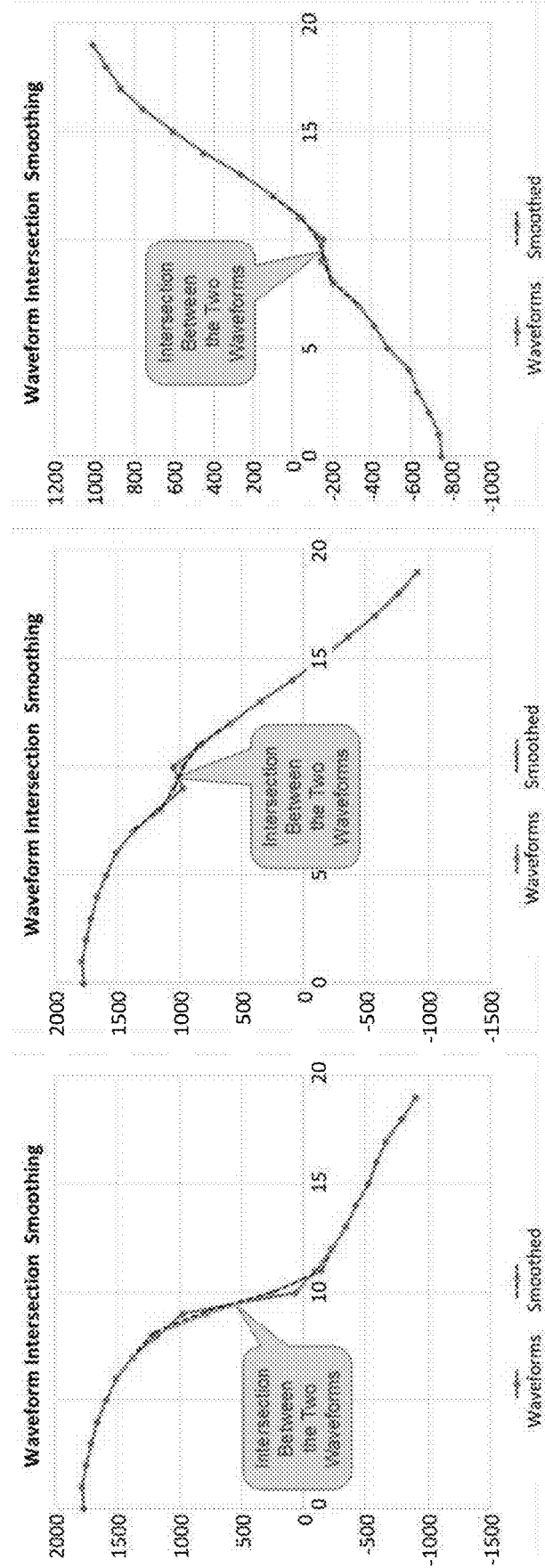
FIG. 3 depicts examples of plots of intersections of original waveform data with thinned waveform data according to embodiments of the disclosure.

With reference to FIG. 5, the graphical display device 16 is configured to display time waveform plots (step 102), and the data file containing the thinned waveform plot is selected (step 104), such as using a user interface device connected to the data analysis computer 14. The system then reads a number (N) that indicates how many waveform blocks from the original waveform are to be replaced by a reference waveform block (step 106), and it reads the size (RWsize) of the reference waveform block (step 108). In a preferred embodiment, the reference waveform block is a block of the original waveform data. The reference waveform block is then read (step 110) and displayed on the display device (step 112) in a first position (n=1) in a thinned region of the waveform, and a counter is incremented (n=n+1) (step 114). If the value n of the counter is not less than N (step 116), the process loops back to step 106. If the value n of the counter is less than N, the size (Wsize) is read of the next waveform block that is to be replaced by the reference waveform block (step 118). If the size (Wsize) of the next waveform block equals the size (RWsize) of the reference waveform block (step 120), the reference waveform block is displayed on the display device (step 122). If the size (Wsize) of the next waveform block does not equal the size (RWsize) of the reference waveform block (step 120), the reference waveform block is adjusted to fit into the size (Wsize) of the next waveform block (step 126) and the adjusted reference waveform block is displayed on the display device (step 128). The intersection between the just displayed waveform block and the previously displayed waveform block is then smoothed using one of the smoothing techniques depicted in FIG. 3 (step 124). The process then loops back to increment the counter (n=n+1) at step 114, and steps 116-126 are repeated until the value of n is not less than N.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A vibration data collection and display system comprising:
    a vibration data collection device that monitors vibration of a machine, the vibration data collection device comprising:
        a vibration sensor that senses vibration of the machine and generates a vibration signal;
        analog-to-digital conversion circuitry that generates original machine vibration waveform data based on the vibration signal, wherein the original machine vibration waveform data include first continuous blocks of data that indicate an occurrence of a vibration event related to a potential fault or performance problem in the machine separated in time by second continuous blocks of data that do not indicate an occurrence of a vibration event related to a potential fault or performance problem in the machine; and
        data storage circuitry that removes the second continuous blocks of data, thereby resulting in thinned waveform data comprising the first blocks of data separated in time by blank gaps from which the second continuous blocks of data have been removed, and stores the thinned waveform data;
    a data analysis computer that receives the thinned waveform data and executes instructions to generate a thinned waveform plot based on the thinned waveform data, wherein the thinned waveform plot comprises the first blocks of data that are separated in time by gaps representing the second continuous blocks of data that have been removed; and
    a display device in communication with the data analysis computer for displaying the thinned waveform plot for viewing by an analyst.

2. The vibration data collection and display system of claim 1 wherein the vibration data collection device comprises a handheld measurement device, and wherein the vibration sensor is momentarily attached to the machine while the original machine vibration waveform data is generated.

3. The vibration data collection and display system of claim 1 wherein the vibration data collection device comprises a networked measurement device that is semi-permanently installed on the machine for continuously generating the original machine vibration waveform data, and that communicates the thinned waveform data to the data analysis computer via a communication network.

4. A vibration data collection and display system comprising:
    a vibration data collection device that monitors vibration of a machine, the vibration data collection device comprising:
        a vibration sensor that senses vibration of the machine and generates a vibration signal;
        analog-to-digital conversion circuitry that generates original machine vibration waveform data based on the vibration signal, wherein the original machine vibration waveform data include first continuous blocks of data that indicate an occurrence of a vibration event related to a potential fault or performance problem in the machine separated in time by second continuous blocks of data that do not indicate an occurrence of a vibration event related to a potential fault or performance problem in the machine; and data storage circuitry that removes the second continuous blocks of data, thereby resulting in thinned waveform data comprising the first blocks of data separated in time by blank gaps from which the second continuous blocks have been removed, and stores the thinned waveform data;

a data analysis computer that receives the thinned waveform data and executes instructions to generate a thinned waveform plot based on the thinned waveform data, wherein the thinned waveform plot comprises the first blocks of data and representative blocks of data that each represent the second continuous blocks of data that have been removed, wherein the representative blocks of data comprise continuous blocks of the original machine vibration waveform data that have been inserted into the blank gaps, wherein the first blocks of data are depicted in a first color or first line style, and the representative blocks of data are depicted in a second color or second line style that is different from the first color or first line style; and a display device in communication with the data analysis computer for displaying the thinned waveform plot for viewing by an analyst.

5. The vibration data collection and display system of claim 4 wherein the data analysis computer executes instructions to implement a curve-fitting process in the thinned waveform plot at each intersection between a first block of data and an adjacent representative block of data, thereby smoothing transitions from the first blocks of data to adjacent representative blocks of data in the thinned waveform plot.

6. The vibration data collection and display system of claim 5 wherein the curve-fitting process comprises a polynomial curve-fitting process.

7. The vibration data collection and display system of claim 4 wherein intersections between the first blocks of data and adjacent representative blocks of data temporally coincide with pulses generated by a tachometer that indicate a rotational speed of the machine.

8. The vibration data collection and display system of claim 4 wherein the vibration data collection device comprises a handheld measurement device, and wherein the vibration sensor is momentarily attached to the machine while the original machine vibration waveform data is generated.

9. The vibration data collection and display system of claim 4 semi-permanently installed on the machine for continuously generating the original machine vibration waveform data, and that communicates the thinned waveform data to the data analysis computer via a communication network.

10. A method for collection and display of vibration data, comprising:

(a) monitoring vibration of a machine using a vibration sensor that senses vibration of the machine and generates a vibration signal and analog-to-digital conversion circuitry that generates original machine vibration waveform data based on the vibration signal, wherein the original machine vibration waveform data include first continuous blocks of data that indicate an occurrence of a vibration event related to a potential fault or performance problem in the machine separated in time by second continuous blocks of data that do not indicate an occurrence of a vibration event related to a potential fault or performance problem in the machine;

(b) removing the second continuous blocks of data using data storage circuitry, thereby resulting in thinned waveform data comprising the first blocks of data separated in time by blank gaps from which the second continuous blocks of data have been removed;

(c) storing the thinned waveform data using the data storage circuitry;

(d) generating a thinned waveform plot based on the thinned waveform data using a data analysis computer, wherein the thinned waveform plot comprises the first blocks of data that are separated in time by gaps representing the second continuous blocks of data that have been removed; and (e) displaying the thinned waveform plot for viewing by an analyst using a display device.

* * * * *